United States Patent [19]

Alden

[11] 3,875,577

[45] Apr. 1, 1975

[54] CASSETTE WITH INTEGRAL ELECTRODE FOR MARKING ELECTRIC RECORDING PAPER CONTAINED THEREIN

[75] Inventor: John M. Alden, Needham, Mass.

[73] Assignee: Alden Research Foundation, Westboro, Mass.

[22] Filed: Sept. 10, 1973

[21] Appl. No.: 391,851

[52] U.S. Cl. .............................................. 340/74 E

[51] Int. Cl. .......................................... G01d 15/06

[58] Field of Search .......... 346/74 E, 74 CH, 74 ES, 346/74 SC, 101, 145; 360/132, 134

[56] References Cited

UNITED STATES PATENTS

| | | | |
|---|---|---|---|
| 2,825,622 | 3/1958 | Cohen et al. | 346/74 E |
| 2,908,540 | 10/1959 | Bell et al. | 346/74 E |
| 3,545,004 | 12/1970 | Alden | 346/74 E |
| 3,761,952 | 9/1973 | Simpkins | 346/74 E |

OTHER PUBLICATIONS

IBM Tech. Disc. Bull., Vol. 15, No. 2, July 1972, p. 385, Paper Handling System, Goodman et al.

*Primary Examiner*—Terrell W. Fears
*Assistant Examiner*—Jay P. Lucas
*Attorney, Agent, or Firm*—James H. Grover

[57] ABSTRACT

A cassette in an electrolytic graphic recorder has thin plastic walls forming a compartment for a supply roll of moist electrolytic recording web and an integral flattened tube extending to a web exit slit. The walls of the tube are spaced by approximately the thickness of the web which therefor moisture seals the supply compartment. An L-shaped blade electrode attached on top of the tube has a recording edge extending across the exit slit into opposition with a scanner with which it cooperates to record on the web as it is drawn from the supply compartment through the exit and between the electrode and scanner. Register means on the recorder engage terminal portions of the cassette electrode and position the electrode in opposition to the scanner as well as electrically connecting the electrode to a marking signal terminal on the recorder.

10 Claims, 5 Drawing Figures

CASSETTE WITH INTEGRAL ELECTRODE FOR MARKING ELECTRIC RECORDING PAPER CONTAINED THEREIN

BACKGROUND OF THE INVENTION

In electrolytic recording of graphic signals the signals are applied to moist electrolytic recording web by electrolytic erosion and deposition from the blade electrode as it is drawn between a linear or blade electrode and a scanner which may be a moving electrode such as a rotating helix or an orbitting stylus on a belt, or the scanner may be an array of fixed styli to which signals are fed from a commutator. In any case the web must be moist as it passes between the blade electrode and scanner and the electrode must have a good electrical connection to the source of signals and the electrode and scanner must be rather precisely positioned with respect to each other. When the blade electrode and scanner are both mounted in a recorder housing moisture retention, good electrical connection and electrode position may be insured. But when the blade electrode is on a cassette detachably inserted in the recorder housing problems of electrolyte moisture loss, poor connection of the blade electrode to a signal terminal in the recorder housing and misalignment of the electrode and scanner arise.

Accordingly objects of the present invention are to provide an inexpensive cassette containing a supply of moist electrolytic recording web, the cassette mounting a blade electrode allowing the cassette to be discarded when the paper and electrode are consumed.

SUMMARY OF THE INVENTION

According to the invention a cassette for a recorder having a terminal carrying an electrical signal to be marked on a moist recording web comprises a housing forming a supply compartment for moist recording web and an exit for the web, and an electrically conductive linear electrode attached to the housing at the exit, the electrode being formed with a recording edge parallel to the exit and with a terminal portion mechanically and electrically connected to the recording edge and shaped to detachably engage the signal terminal member on the recorder and positively to position the electrode with respect to the terminal member and maintain electrical contact therewith.

DRAWINGS

DESCRIPTION

Figure 1:
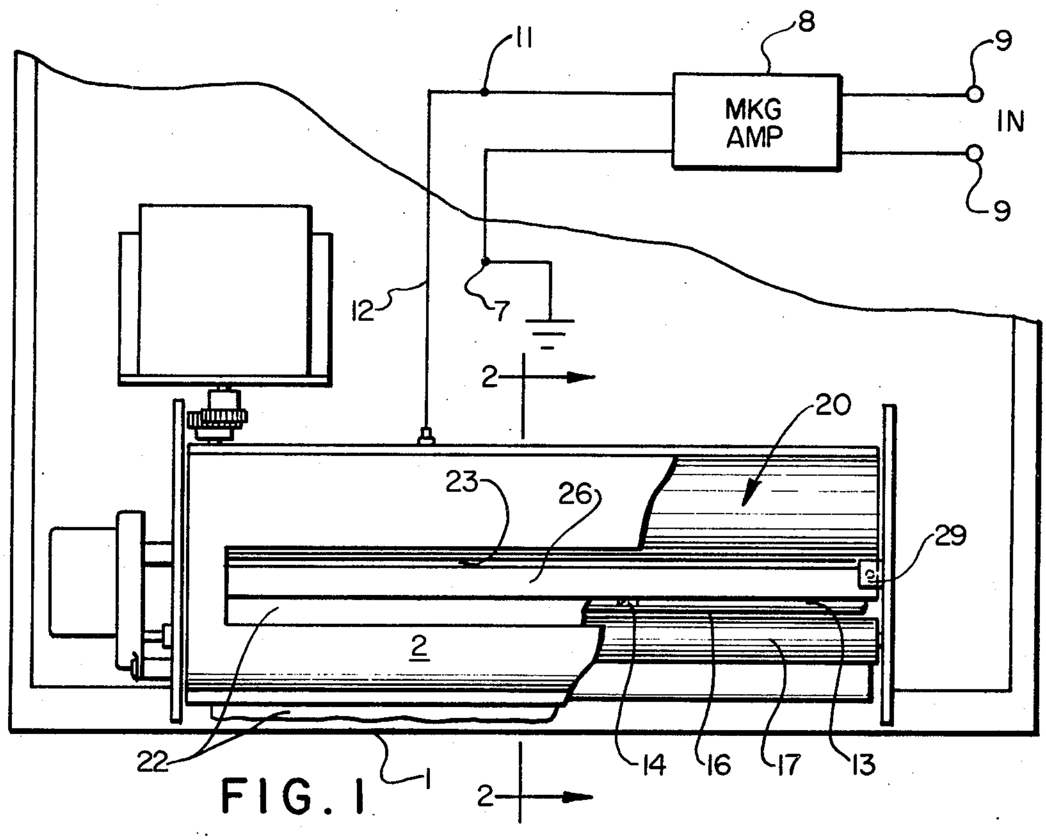
FIG. 1 is a plan view of an electrolytic cassette recorder according to the invention.
Figure 2:
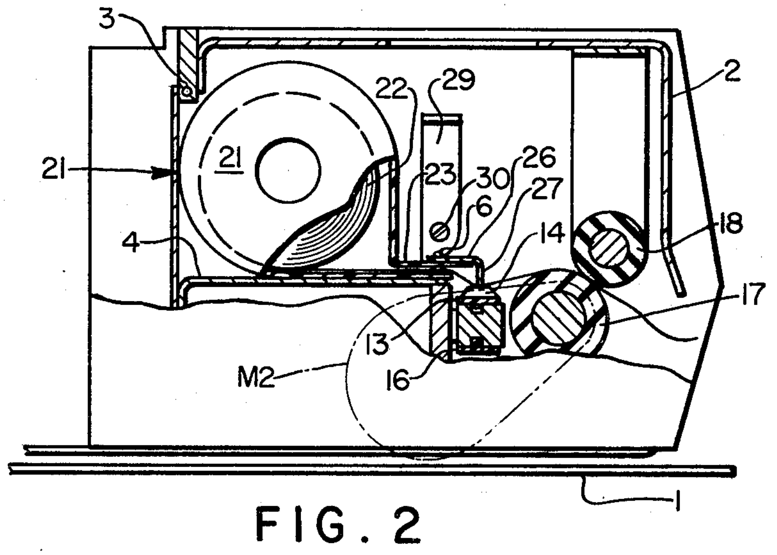
FIG. 2 is a side elevation of the recorder shown partly on line 2—2 of FIG. 1.

As shown in FIGS. 1 and 2 an electrolytic graphic recorder comprises a base 1 with a cover 2 hinged to the base at 3. A platform 4 on the base has upstanding register pins 6 electrically and mechanically connected to the platform 4 which, in turn, is electrically connected through the base 1 to the grounded terminal 7 of a facsimile signal marking amplifier 8. The platform 4 and pins 6 constitute one signal terminal. The marking amplifier has facsimile input terminals 9 and a second signal terminal 11 connected through an insulated lead wire 12 to a scanning bolt 13. The scanning belt 13 carries one or more marking styli 14 and orbits in a loop around a track 16. The stylus orbitting path has a linear portion parallel to the front edge of the platform 4 and slightly forward of and below the platform edge. The stylus belt 13 is driven by a motor M1 causing the styli repeatedly to scan the linear path or recording zone. A slow speed synchronous motor M2 drives a paper feed roll 17 which, in turn, drives an idler roll 18 attached to the cover 2.

Figure 3:
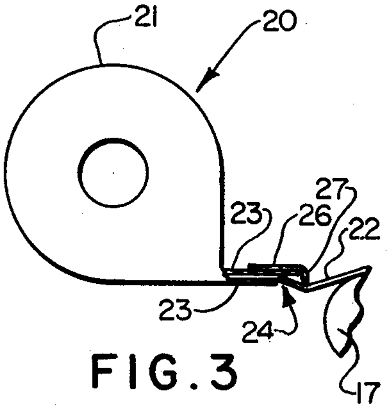
FIG. 3 is a side elevation of the cassette.
Figures 4, 5:
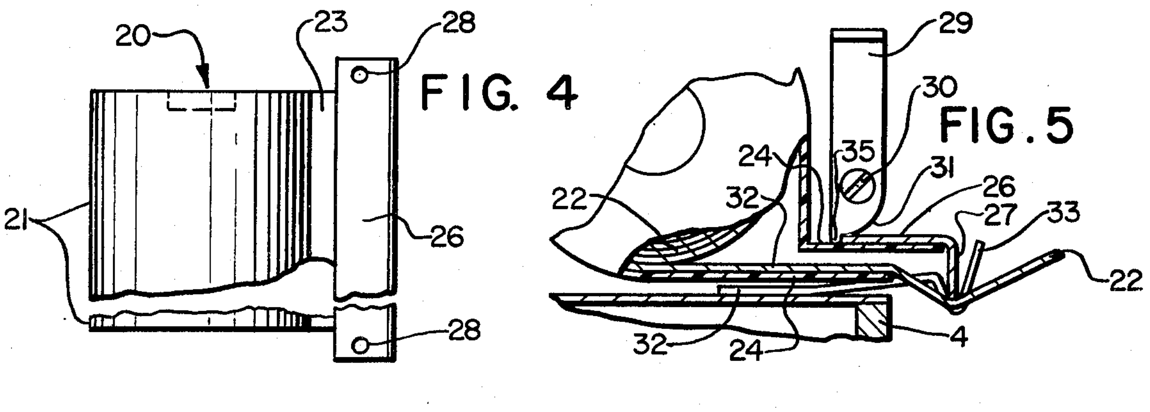
FIG. 4 is a plan view of the cassette.
FIG. 5 is an enlarged sectional view of an alternate form of cassette blade showing details of the blade engagement with the signal terminal of the recorder.

The platform 4 supports a cassette 20 shown in FIGS. 3 and 4. The cassette comprises a circular portion 21 forming a compartment for a supply roll of moist electrolytic recording web or paper 22. Integral with the circular portion 21 is a flat tubular portion 23 forming a web path from the supply compartment to a web exit slit 24 from the cassette. The walls of the flat tubular portion are vertically spaced apart approximately the thickness of the web so that the web fills the tube 24 and forms a moisture retaining barrier for the moist web roll in the supply compartment.

Attached to the top of the cassette exit tube 24 is an elongate blade or straight recording electrode 26. The blade is bent in an L-shape with the upper arm of the L on the flat tube and the other arm extending transversely of the web exit slit 24 to a recording edge 27 running parallel to the web exit slit. At each end of the upper arm of the L where it extends laterally beyond the exit is a register aperture 28 receiving one of the register pins 6 at the forward edge of the platform 4. Mating of the apertures 28 with the pins 6 not only electrically connects the blade electrode 26 to the marking circuit through the platform acting as a signal terminal, but also positively positions the recording edge parallel to the straight portion of the stylus path below the recording edge. Preferably a locking arm 29 pivotted at 30 and with a cam end 31 is swung over each end of the blade 26 to jam the blade ends against the platform 4 and lock the blade in mating engagement with the pins 6. The locking may, however, be accomplished with a frictional fit of the register pins and apertures.

In operation the moist recording web is drawn by the feed and idler rolls 17 and 18 from the roll in the supply compartment, through the flat tube 23 to the exit 24, and thence in around the recording edge whose offset from the plane of the web path tends to tension and smooth the moist web. Signals applied between the styli 14 on the orbitting belt 13 mark the web line by line as it is drawn around the blade.

As shown in FIG. 5, as an alternative to the register pins of FIG. 2, the platform 4 may be provided at each side wtith an overlying conductive strip 32 bent into U-shape at its forward end 33 to form a socket for the recording edge portion 27 of the blade 26 which extends laterally beyond the sides of the flat tube 23. That is the conductive strips 32 lie under the blade portions having apertures 28 in FIG. 4. As in FIG. 2 the locking lever 29 jams the blade in the U-shaped sockets 33 forming the electrical connection between the blade 26 and the sockets 33 which act as signal terminals. The lever is swung until a nose 35 stops at the back of the blade 26. The conductive strips 32 may be attached to the platform 4 only at their rearward end allowing the free, flexible front end to yield downwardly and insure proper pressure contact with the paper web at the recording line scanned by the styli 6.

It should be understood that the present disclosure is for the purpose of illustration only and that this invention includes all modifications and equivalents which fall within the scope of the appended claims.

I claim:

1. A cassette adapted to be detachably mounted in a recorder, the recorder having a terminal carrying an electrical signal to be marked on a moist recording web in a recording zone defined by the recorder, the cassette comprising:

a housing forming a supply compartment for moist recording web and an opening for the web at the recording zone, and an electrically conductive linear electrode attached to the housing at the opening, the electrode being formed with a recording edge parallel to the opening and with a terminal portion mechanically and electrically connected to the recording edge and shaped to detachably engage the signal terminal member on the recorder and positively to position the electrode with respect to the terminal member and recording zone and maintain electrical contact between the linear electrode and terminal member.

2. A cassette according to claim 1 wherein the housing supply compartment contains a roll of moist electrolytic recording web and comprises walls forming a flat tube extending from the compartment providing a web path to the opening, the tube walls being spaced apart substantially the thickness of the web so that the web forms a moisture retaining barrier for the moist web roll.

3. A cassette according to claim 1 wherein said electrode comprises a continuous elongate metal strip attached to the exterior of the housing with the terminal portion extending laterally beyond the opening, and register means on the terminal portion shaped to engage the signal terminal member.

4. A cassette according to claim 3 wherein the electrode comprises a strip disposed above the opening and the register means comprises an aperture transverse of the opening.

5. A cassette according to claim 3 wherein the electrode comprises a strip folded in approximate L-shape, one arm of the L comprising a recording edge with a terminal portion thereof extending laterally beyond the opening to form register means.

6. A cassette according to claim 3 wherein the electrode comprises a strip disposed below the opening and the register means comprises an aperture transverse of the opening.

7. An electric graphic recorder for marking on a moist electric recording web comprising a cassette according to claim 1 and further comprising a signal terminal with register means mating with the terminal portion of the cassette electrode.

8. A recorder according to claim 7 wherein the recorder comprises scanning means disposed on the recorder adjacent to the register means, the register means locating the cassette electrode in opposition to the scanning means.

9. A recorder according to claim 7 further characterized by locking means on the recorder movably engaging the cassette electrode thereby to urge the terminal portion of the electrode into engagement with the register means.

10. A recorder according to claim 9 wherein the recorder comprises scanning means disposed on the recorder adjacent to the register means, the register means locating the cassette electrode in opposition to the scanning means.

* * * * *